Figure 4:
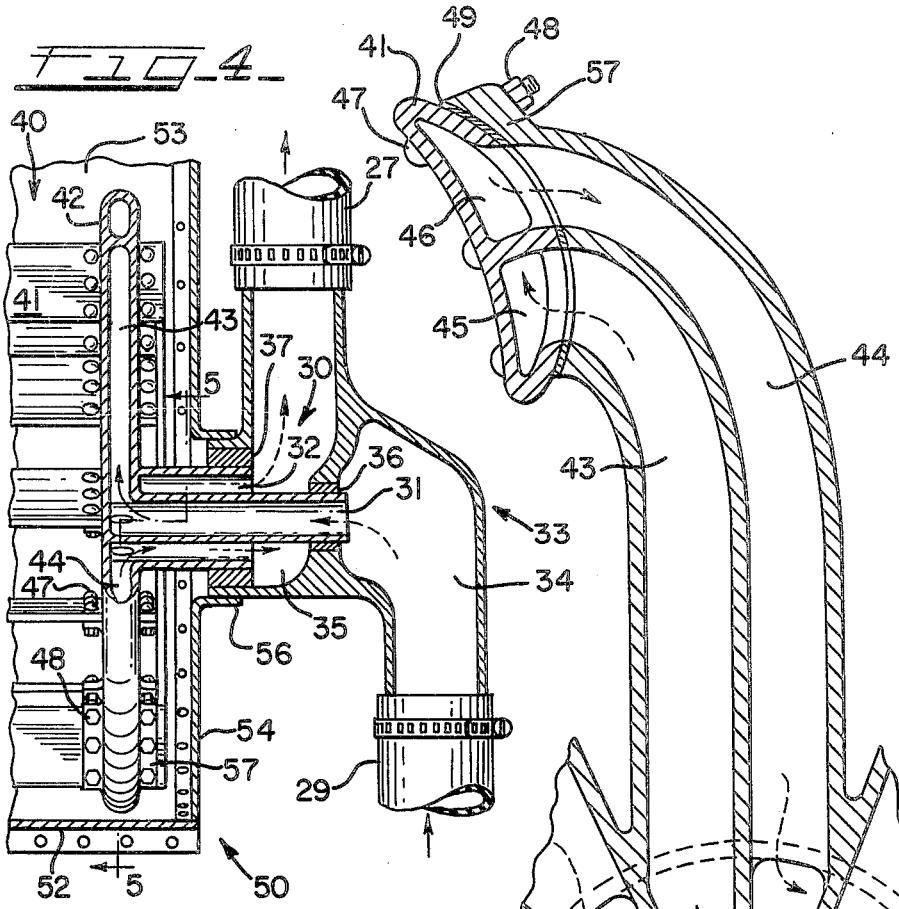
Figure 5:
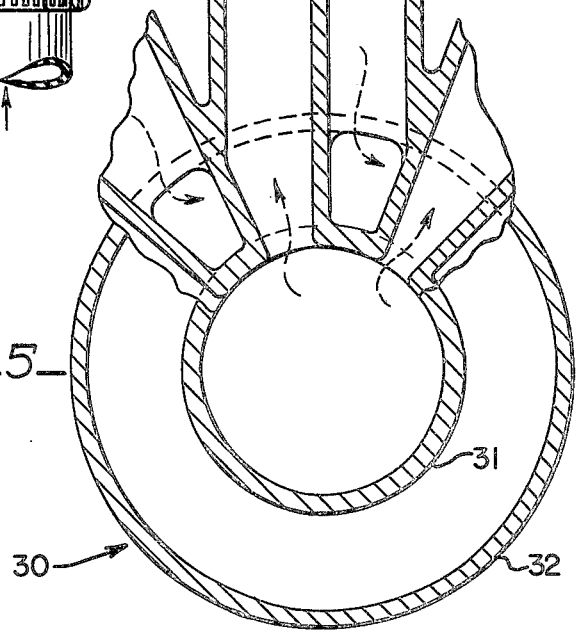
Figure 6:
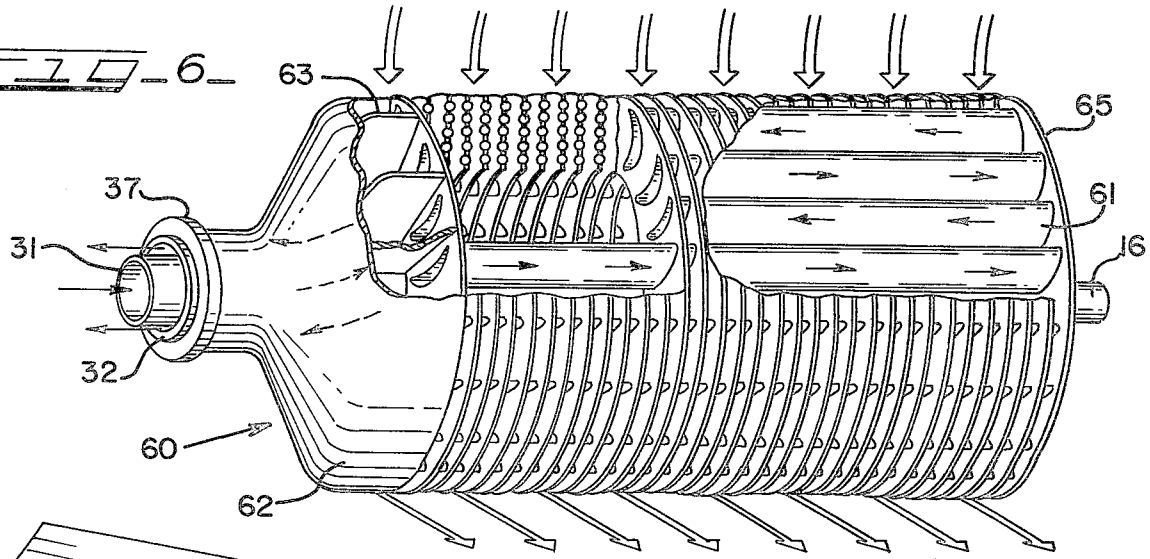
Figure 7:
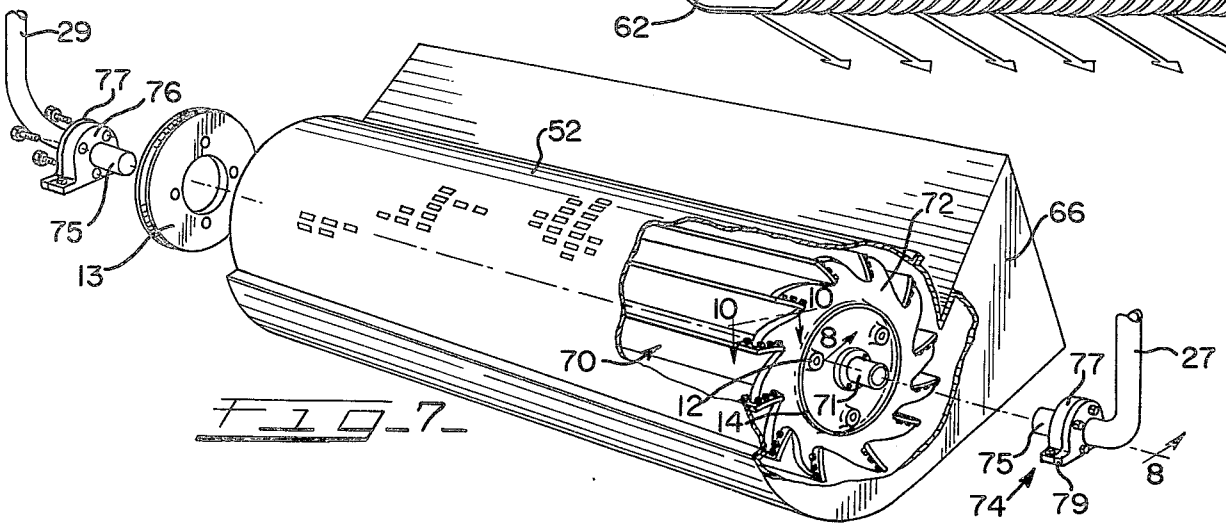
Figures 8, 9, 10, 11:
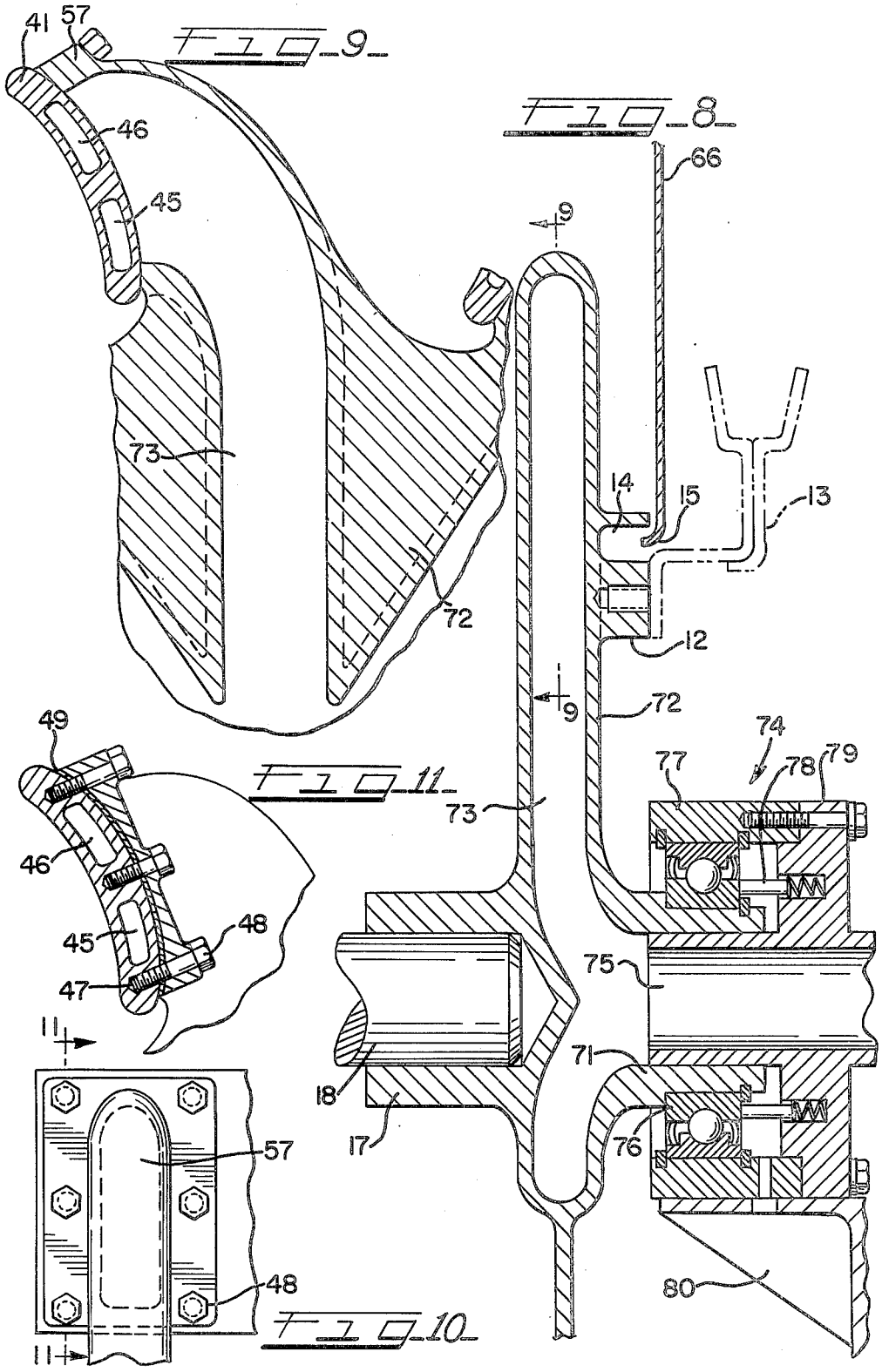

United States Defensive Publication [19] (H) [11] T993,003

Kolthoff, Jr. [43] Apr. 1, 1980

[54] FAN FOR COMBINE

[75] Inventor: C. Paul Kolthoff, Jr., Naperville, Ill.

[73] Assignee: International Harvester Company, Chicago, Ill.

[21] Appl. No.: 4,115

[22] Filed: Jan. 17, 1979

[51] Int. Cl.[2] ..... B07B 11/02

[52] U.S. Cl. ..... 209/11; 130/27 A; 165/86; 34/86; 56/12.2

[57] ABSTRACT

A cross flow blower unit for use in a grain cleaning system of a self-propelled combine harvester. The rotor of the blower unit doubles as a rotary heat exchanger for use in the engine coolant system and furnishes a heated air stream to the grain cleaning system for drying and removing moisture from the kernels of grain undergoing cleaning treatment therein.

7 Claims, 4 Sheets Drawing,

11 Pages Specification

The file of this unexamined application may be inspected and copies thereof may be purchased (849 O.G. 1221, Apr. 9, 1968).

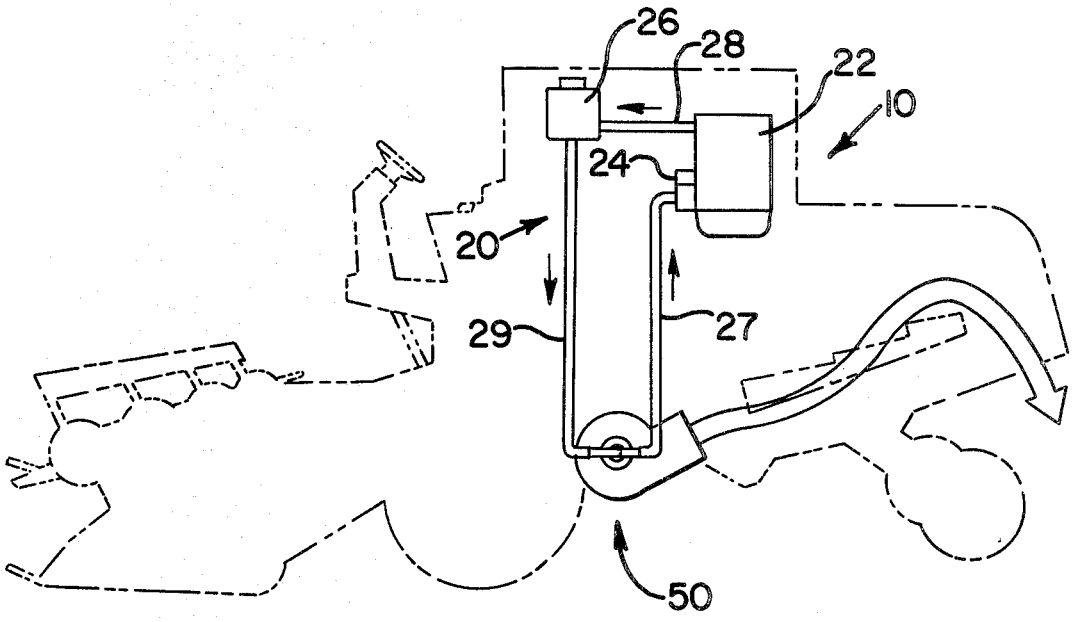

FIG. 1
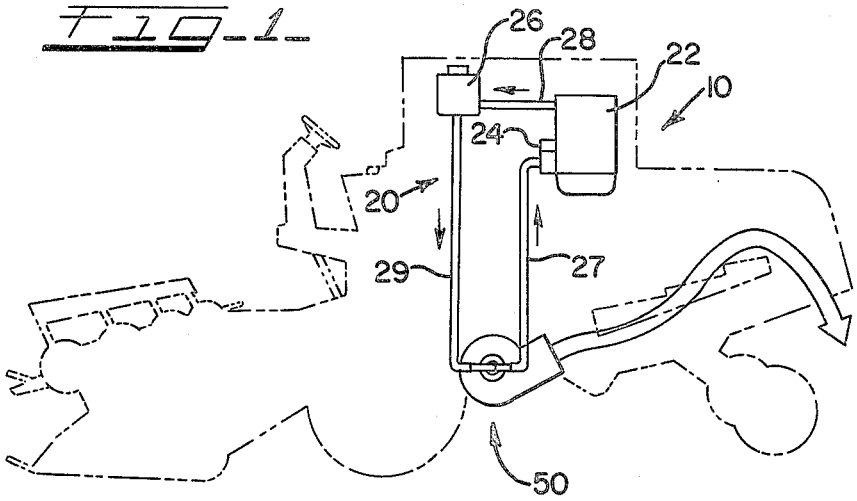
FIG. 2
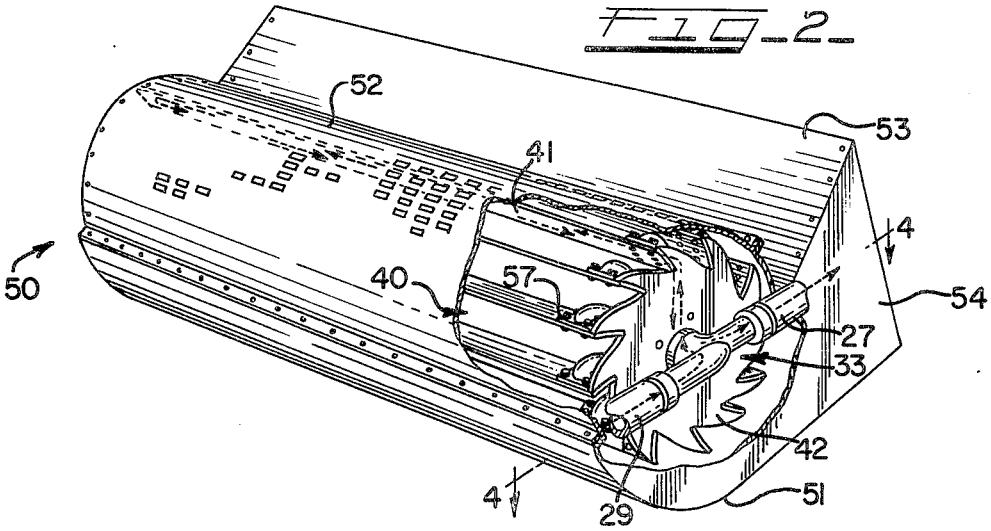
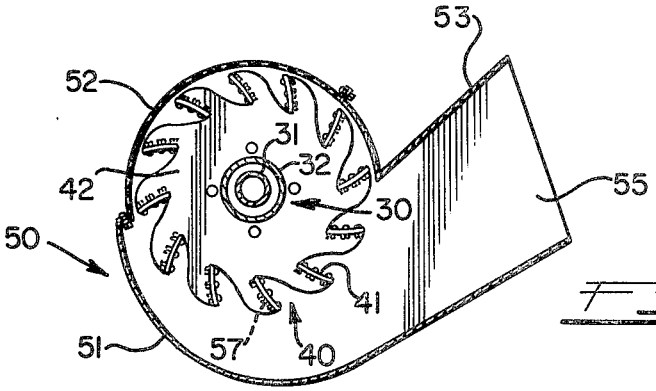
FIG. 3

41
57
46
45
73
72
66
9
14
15
13
12
74
77
78
79
75
71
76
80
18
17
49
48
47
11